United States Patent [19]

Sharp et al.

[11] Patent Number: 5,619,355
[45] Date of Patent: Apr. 8, 1997

[54] LIQUID CRYSTAL HANDEDNESS SWITCH AND COLOR FILTER

[75] Inventors: Gary D. Sharp, Boulder; Kristina M. Johnson, Longmont, both of Colo.

[73] Assignee: The Regents of the University of Colorado, Boulder, Colo.

[21] Appl. No.: 131,725

[22] Filed: Oct. 5, 1993

[51] Int. Cl.$^6$ ............... G02F 1/1335; G02F 1/1347; G02F 1/141

[52] U.S. Cl. ............... 349/78; 349/98; 349/116; 349/194

[58] Field of Search ............... 359/53, 65, 73, 359/93, 100, 64, 66, 37, 101

[56] References Cited

U.S. PATENT DOCUMENTS

| | | | |
|---|---|---|---|
| 4,017,156 | 4/1977 | Moriyama et al. | 350/160 |
| 4,032,218 | 6/1977 | Scheffer | 359/37 |
| 4,246,302 | 1/1981 | Benton et al. | 428/1 |
| 4,674,841 | 6/1987 | Buzak | 350/337 |
| 4,726,663 | 2/1988 | Buzak | 350/347 |
| 4,770,500 | 9/1988 | Kalmanash et al. | 350/347 E |
| 4,870,486 | 9/1989 | Nakagawa et al. | 359/63 |
| 4,991,924 | 2/1991 | Shankar et al. | 359/37 |
| 4,991,941 | 2/1991 | Kalmanash | 350/347 E |
| 5,050,965 | 9/1991 | Conner et al. | 359/53 |
| 5,082,354 | 1/1992 | Kalmanash | 350/339 F |
| 5,124,818 | 6/1992 | Conner et al. | 359/53 |
| 5,132,826 | 7/1992 | Johnson et al. | 359/93 |
| 5,221,982 | 6/1993 | Faris | 359/93 |
| 5,235,443 | 8/1993 | Barnik et al. | 359/37 |
| 5,347,378 | 9/1994 | Handschy et al. | 359/53 |

OTHER PUBLICATIONS

PCT Written Opinion dated 31 Jul. 1995 for PCT/US94/11326.

Anderson, G. et al., "Device physics of the soft–mode electro–optic effect," J. Appl. Phys. (1989) 66(10):4983–4995.

PCT International Search Report dated 25 Jan. 1995.

F. Mosini and N. V. Tabiryan, "Cholesteric liquid crystal resonators and systems with addressable colors", (1993) SPIE vol. 1988 Display Systems, pp. 28–33.

Chu Shik Kang and Hong Jin Kong, "Liquid Crystal Linear Polarizers for Faraday Isolator in a High–Power Laser System", IEEE Photonics Technology Letters, vol. 4, No. 9, Sep. 1992, pp. 1038–1040.

Martin Schadt and Jurg Funfschilling, "New Liquid Crystal Polarized Color Projection Principle", Jap. Journal of App. Physics, vol. 29, No. 10, Oct. 1990, pp. 1974–1984.

H. Finkelmann and H.J. Kock, "Liquid Crystal Side Chain Polymers: Properties and Aspects for Applications", Display Technology, vol. 1, (1985), pp. 81–94.

Charles J. Koester, "Achromatic Combinations of Half–Wave Plates", Journal of the Optical Soc. of America, vol. 49(4), Apr. 1959, pp. 405–409.

*Primary Examiner*—William L. Sikes
*Assistant Examiner*—Tai V. Duong
*Attorney, Agent, or Firm*—Greenlee, Winner and Sullivan, P.C.

[57] ABSTRACT

This invention provides a liquid crystal polarization handedness switch, and optical devices employing the handedness switch in conjunction with optical elements which are sensitive to the handedness of incident light. The handedness switch receives unpolarized light and converts it into circularly polarized light with switchable handedness. In combination with cholesteric circular polarizers, switchable color filters are provided. The color filters of this invention include the analogous x-y polarization switch combined with colored partial polarizers. The liquid crystals employed in the color filter of this invention can include SmC*, SmA*, antiferroelectric, DHF, achiral ferroelectric and twisted nematic liquid crystals.

20 Claims, 6 Drawing Sheets

LIQUID CRYSTAL HANDEDNESS SWITCH AND COLOR FILTER

FIELD OF THE INVENTION

This invention relates to a polarization handedness switch for receiving light and converting it into circularly polarized light with switchable handedness, and to color filters employing the handedness switch in conjunction with cholesteric circular polarizers.

BACKGROUND OF THE INVENTION

Liquid crystals can be divided into three classes based on molecular ordering: nematic, smectic, and cholesteric. Nematic liquid crystals are arranged with molecular directors parallel but not separated into layers. In smectic liquid crystals the molecules are arranged side by side in a series of layers. In the cholesteric phase, sometimes considered a subset of the nematic phase, the molecules are arranged in layers. Within each layer the molecular directors are parallel but not arranged in rows. The alignment of the molecular directors in each layer is slightly displaced from the adjacent layers, so that the molecular directors form a helical structure.

Nematic liquid crystals can provide variable retardation with response times on the order of milliseconds. They have been utilized in a number of applications including displays, spatial light modulators, switches and tunable filters. In twisted nematic cells the orientation of the molecular directors in the proximity of one substrate is at an angle to the orientation at the second substrate and the liquid crystal molecules in between are oriented to form a twisted structure with a twist angle between the orientations at the two substrates which can be electronically tuned. Twisted nematic cells are polarization waveguides which rotate polarization by the twist angle. Twisted nematic cells can provide a binary 90° polarization change.

Chiral smectic liquid crystals (CSLCs) provide response times on the order of microseconds. When incorporated in a planar aligned geometry cell (smectic layers oriented perpendicular to the substrate walls), application of an electric field perpendicular to the cell walls reorients the molecular directors, providing electrooptical rotation. Analog CSLC materials, such as SmA* and distorted helix ferroelectrics (DHF) display an analog tilt of the cell optic axis in the plane of the cell walls. In a discrete, multi-state cell, for example using ferroelectric liquid crystal (FLC) SmC* or SmH* or antiferroelectric phases, application of an electric field above a certain threshold voltage results in switching the tilt of the CSLC molecules between discrete stable states. Recently the ferroelectric effect has been observed in achiral liquid crystals as well.

Cholesteric liquid crystals are characterized by the helical pitch, which is the distance through the film required for the molecular directors to trace a full 360° cycle. Reflection of light is observed when the handedness of the incident polarization matches the helical sense of the cholesteric and when the wavelength, divided by the refractive index of the cholesteric, is approximately equal to the pitch. Thus cholesteric liquid crystals form cholesteric circular polarizers (CCPs), also known as cholesteric filters, which break unpolarized light into right- and left-handed circularly polarized components. The component with the same handedness as the cholesteric is reflected when the wavelength falls within the reflection band and transmitted at other wavelengths. The component with opposite handedness is transmitted at all wavelengths. In contrast to reflection from mirrors, the reflected light does not undergo a 180° phase shift.

Liquid crystal molecules can be linked as a side chain to a polymer backbone to produce structures with the optical properties of liquid crystals and the glassy state of polymers. Cholesteric liquid crystal side chain polymers can be produced in a glassy state without changing the cholesteric optical properties. The polymer can also be coated on a variety of surfaces.

A second area of related art is color display technologies. For color display, the entire gamut of colors can be perceived using a high-speed three-color filter with a white input spectrum. The optimum filter would produce high throughput and high purity spectra for the red, green and blue primary color bands. Note that cyan, magenta and yellow are the perceived colors produced by removing red, green and blue, respectively, from white light.

Previous efforts to produce a liquid crystal tunable color filter have focused on polarization interference filters. However, because of the tradeoff between throughput and spectral purity, the Lyot structure is not optimum for implementing a three-color filter.

Color filters have been reported employing cholesteric circular polarizers (Buzak [1988] U.S. Pat. No. 4,726,663, and Kalmanash [1992], U.S. Pat. No. 5,082,354) or linear polarizing filters (Buzak [1987] U.S. Pat. No. 4,674,841, Buzak [1988] U.S. Pat. No. 4,770,500, and Kalmanash [1991] U.S. Pat. No. 4,991,941). These filters generally contain a means for modulating the polarization of light in combination with a linear or cholesteric polarizing filter which has a polarization dependent transmission spectrum. They generally employ nematic liquid crystal variable retarders in configurations wherein varying the magnitude of the retardance varies the output polarization. They do not employ smectic liquid crystal cells with rotatable orientation of the optic axis perpendicular to the direction of light propagation and indeed their device configurations are incompatible with rotatable orientation liquid crystal cells.

SUMMARY OF THE INVENTION

This invention provides a liquid crystal polarization handedness switch, and optical devices employing the handedness switch in conjunction with optical elements which are sensitive to the handedness of incident light. The handedness switch receives unpolarized light and converts it into circularly polarized light with switchable handedness. In combination with cholesteric circular polarizers, switchable color filters are provided. Because CCPs have broad, high throughput reflection bands, these filters are ideally suited to color display.

The handedness switch of this invention comprises a linear input polarizer and a quarter-wave retarding means, which can include a smectic liquid crystal cell. In a first embodiment of the handedness switch, the liquid crystal cell is a quarter-wave retarder which can be electrooptically switched between orientations of $+\pi/4$ and $-\pi/4$ with respect to the linear polarization. This changes the output between right- and left-handed circular polarizations. In a second embodiment, the liquid crystal cell is a half-wave retarder, which is further followed by a passive quarter-wave retarder oriented at $\pm\pi/4$. The liquid crystal half-wave retarder can be electrooptically switched between a first orientation parallel or perpendicular to the linear input state and a second orientation at $\pm\pi/4$ with respect to the linear input state.

Switching the half-wave retarder rotates the polarization by π/2, which reverses the handedness of the light transmitted by the passive quarter-wave retarder. Response times of microseconds can be achieved with a smectic liquid crystal half-wave retarder. The half-wave retarder can alternatively be any means for rotating the polarization by π/2, including a twisted nematic cell, a PLZT or $LiNbO_3$ electrooptic modulator, a magneto-optic modulator, or an acousto-optic modulator. In analog embodiments of the handedness switch, the orientation of the liquid crystal quarter-wave or half-wave retarder can be continuously varied, thus producing a continuously variable linear combination of right- and left-handed circularly polarized light.

The handedness switch used in reverse, i.e. with light incident on the quarter-wave plate rather than the polarizer, is a circular analyzer which converts circular polarization into linear polarization and can switch between converting right-hand or left-hand polarized light into linearly polarized light parallel to the polarizer. Light of the other handedness becomes linearly polarized perpendicular to the polarizer and is therefore extinguished.

The handedness switch of this invention can be used in conjunction with devices which are sensitive to the handedness of incident polarized light, that is devices whose optical characteristics (such as transmission, reflection or retardation) depend on the handedness of incident light. This invention includes color filters comprising the handedness switch in combination with cholesteric circular polarizers. CCPs reflect circularly polarized light of a specified handedness within a selected wavelength range, while wavelengths outside of the reflection band are transmitted. Opposite handedness circularly polarized light is fully transmitted. Thus switching the handedness of incident light changes the transmission and reflection through CCPs. The filters of this invention employ a liquid crystal handedness switch in combination with CCPs to provide, for example, one, two, and three color filters.

The one-color two-state filter of this invention comprises a handedness switch followed by a CCP. In reflection, the filter switches between reflecting a color and reflecting no light (color/off). In transmission, the filter switches between transmitting a small range of color and transmitting all wavelengths (color/on).

The two-color filter of this invention comprises a handedness switch followed by at least one left-handed CCP and at least one right-handed CCP. The reflection bands of the CCPs are chosen so that the filter switches between two selected colors in either transmission or reflection. For example, a simple two-color filter can be implemented by following the handedness switch with one left-handed and one right-handed CCP. The first CCP reflects a particular color (say blue) for left-handed light and transmits all wavelengths of right-handed light. The following CCP reflects a second color (say red) of right-handed light and transmits all left-handed circular light. Therefore, modulation of the handedness switch between left- and right-handed circular light switches between reflection of blue and red light.

A three-color filter of this invention can be made in transmission or reflection mode with two handedness switches in series. In the transmission mode a single polarizer can form a part of both a forward and a reverse handedness switch. On either side of the polarizer are liquid crystal quarter-wave plates. On either side of the quarter-wave plates are at least one right-handed CCP and at least one left-handed CCP. Switching the orientations of the liquid crystals switches between the transmission of three different colors.

It is preferred that the handedness switch be achromatic over the wavelength range of operation. For a color filter, this may be the entire visible spectrum. Compound handedness switches using passive retarders in combination with liquid crystal retarders can reduce the chromaticity of the handedness switch.

Within the scope of this invention, color filters comprising a handedness switch and right- and left-handed CCPs can alternatively be constructed with an x-y polarization switch and x and y oriented color partial polarizers. An x-y polarization switch can be constructed with a linear polarizer and a liquid crystal half-wave plate which switches between orientations parallel to the polarizer and at π/4 to the polarizer.

This invention comprises a liquid crystal handedness switch and color filters which utilize the handedness switch. The handedness switch can be used in any application which includes handedness sensitive optical components. Filters employing cholesteric circular polarizers are one example of the utility of the handedness switch. It can be used in the same configurations with other colored circular polarizers. The color filters described herein are but a few examples of the color filters which can be constructed with the handedness switch of this invention. Other filter designs can be tailored to a given application, as will be readily apparent to those skilled in the art. The color filters of this invention include the analogous x-y polarization switch combined with colored partial polarizers. The liquid crystals employed in the handedness switch of this invention can include SmC*, SmA*, antiferroelectric, DHF, achiral ferroelectric and twisted nematic liquid crystals. The CCPs can be contained between substrates or can be in polymerized forms. The scope of this invention is not limited to the specific examples included herein. To those skilled in the art variations in the construction and applications of the handedness switch and the color filters will be readily apparent.

BRIEF DESCRIPTION OF THE DRAWINGS

FIG. 1 is a handedness switch employing a polarizer and either an FLC quarter-wave plate (FIG. 1a) or an FLC half-wave plate in combination with a passive quarter-wave plate (FIG. 1b).

FIG. 3 is a two-color filter employing a liquid crystal handedness switch (FIG. 3a), and the filter operation with the switch producing left-handed light (FIG. 3b) and right-handed light (FIG. 3c).

FIG. 6 is a transmission mode two-stage three-color filter employing two liquid crystal handedness switches (FIG. 6a), and an achromatic embodiment of the three-color filter (FIG. 6b).

DETAILED DESCRIPTION OF THE PREFERRED EMBODIMENTS

Referring now to the drawings, like reference numerals identify like elements and the same reference numeral appearing in more than one drawing refers to the same element. Position refers to the position with respect to the light propagation axis. Orientation refers to the orientation of the optic axis in aplane orthogonal to the light propagation axis. One skilled in the art can adapt these devices to light at non-normal incidence or to orientations not in the plane orthogonal to the light propagation axis. Polarizers are represented by arrows showing the axis of polarization. Retarders are represented by boxes with the retardance listed at the top and the orientation of the optic axis with respect to the polarizer listed at the bottom. An orientation of $\pm\pi/4$ means that the orientation can be either $\pi/4$ or $-\pi/4$, not that it switches between these two orientations. In these examples, the smectic liquid crystal cells are ferroelectric liquid crystals. For FLC plates, the orientations between which it can be switched are both listed. Cholesteric circular polarizers are represented by boxes with the handedness of the reflection band listed at the top and the color of the reflection band listed in the middle, using R for red, G for green, B for blue, RG for yellow, GB for cyan, RB for magenta, and RGB for white. The handedness of a CCP refers to the handedness of the reflection band. Linear polarizing filters (LPFs) are represented by boxes with the polarization of the partially transmitted polarization listed on the top and the transmission band listed in the center. In the illustrated devices, the optical elements are optically coupled in series. Elements are referred to as optically coupled when a light propagation axis traverses them. Although the function is different, light can be incident on either end of the devices. Transmission mode refers to light output at the opposite end from the incident light and reflection mode refers to light output at the same end.

Figure 1A:
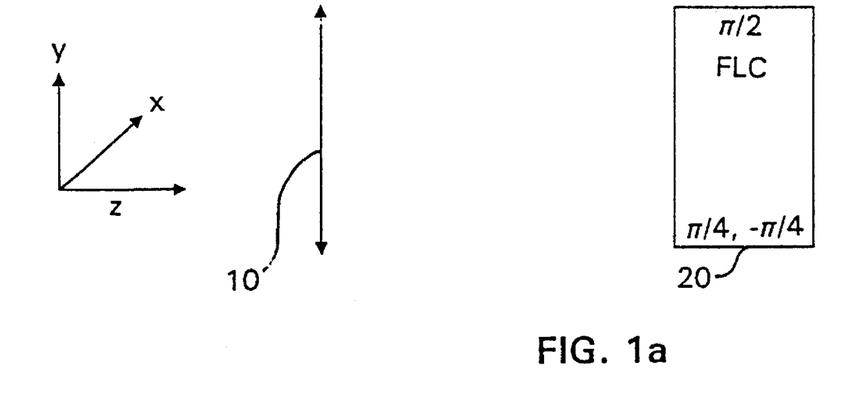

The smectic liquid crystal handedness switch of this invention is illustrated in FIG. 1. In the embodiment of FIG. 1a, it comprises linear polarizer 10 optically coupled with ferroelectric liquid crystal quarter-wave retarder 20. The orientation of the liquid crystal cell can be electrooptically switched between $\pi/4$ and $-\pi/4$ with respect to the axis of the polarizer.

The handedness switch operates as follows. For unpolarized light incident on the polarizer, the component of light with polarization parallel to the axis of the polarizer, the y-axis, is transmitted by the polarizer. When the FLC quarter-wave plate is oriented at $\pi/4$ the polarization of the light is converted to left-handed circular polarization. When the FLC quarter-wave plate is switched to $-\pi/4$, the polarization of output light is switched to right-handed circular polarization.

The handedness switch can operate on polarized light as well as unpolarized light. For polarized light incident on polarizer 10, that component of light which is parallel to the polarizer is transmitted and coupled to FLC 20. Light that is linearly polarized along the axis of the polarizer is transmitted in its entirety (neglecting losses at the polarizer). For a linearly polarized light source, such as a laser, with linear polarization oriented along the y-axis, the linear polarizing means is incorporated in the light source and polarizer 10 can be omitted.

In the reverse handedness switch, unpolarized light is incident on the FLC quarter-wave plate. When the FLC is in the $\pi/4$ orientation, the left-handed circular polarization component is converted to linearly polarized light oriented parallel to and therefore transmitted by the polarizer. In the $-\pi/4$ orientation, the right-handed component becomes linearly polarized parallel to the polarizer.

For circularly polarized light incident on the FLC quarterwave plate of the reverse handedness switch, the switch functions as an on/off amplitude modulator within the range of FLC achromaticity. In one orientation of the FLC plate, the light is transmitted by the polarizer and in the other orientation it is absorbed.

Figure 1B:
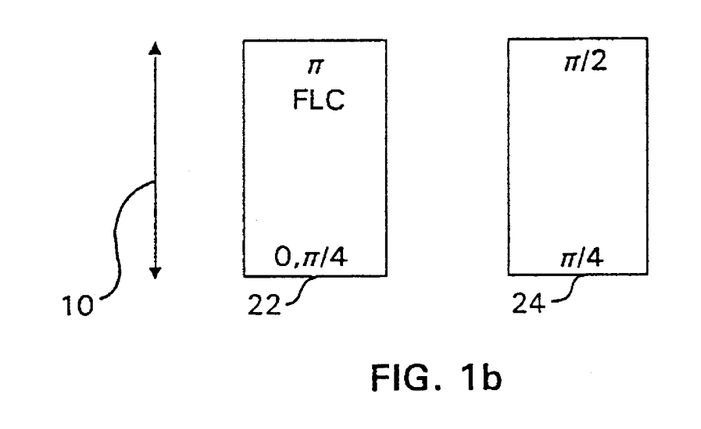

A second embodiment of the handedness switch of this invention is illustrated in FIG. 1b. In this embodiment, FLC half-wave plate 22 is optically coupled with passive quarter-wave plate 24. The orientation of the FLC half-wave plate can be switched between 0 and $\pi/4$ with respect to polarizer 10. Equivalently, the half-wave plate can be oriented so the axis switches between $\pi/2$ and either $\pi/4$ or $-\pi/4$. This combination is functionally equivalent to the embodiment of FIG. 1a. A quarter-wave retarding means is provided by retarder 20 in the embodiment of FIG. 1a and by the combination of retarders 22 and 24 in the embodiment of FIG. 1b. In FIG. 1b, for unpolarized light incident on polarizer 10, the component parallel to the polarizer is transmitted. When FLC plate 22 is oriented at 0 (or $\pi/2$), the polarization is unchanged and passive quarter-wave plate 24 oriented at $\pi/4$ converts the light to left-handed circular polarization. When the FLC half-wave plate is switched to the $\pi/4$ (or $-\pi/4$) orientation, the polarized light is reflected from parallel to perpendicular with respect to the polarizer, and the passive quarter-wave plate converts it to right-hand circularly polarized light.

In other analogous embodiments of the handedness switch, the active or the passive wave plates can be replaced by compound retarders. Compound retarders can functions as achromatic retarders (see, for example, S. Pancharatnam (1955), Ind. Acad. Sci. Proc. 41, 130, or C. J. Koester (1959), J. Opt. Soc. Am. 49, 303, or A. M. Title (1975), Appl. Opt. 14, 229). For example, an achromatic half-wave plate developed by Title replaces one half-wave plate at 0° with three half-wave plates in series oriented at −30°, +30°, and −30°.

Half-wave plate 22 can instead be any means for rotating the polarization by 90°. This can be a twisted nematic liquid crystal cell, a PLZT or LiNbO$_3$ electrooptic modulator, a magnetooptic modulator, or an acousto-optic modulator.

The handedness switch of this invention can also produce linear combinations of the two orthogonal circular polarizations. In this embodiment the orientation of liquid crystal quarter-wave plate 20 is at angles other than $\pm\pi/4$ with respect to the axis of polarizer 10. When it is oriented at 0 or $\pi/2$, the polarization remains linear, which is equivalent to equal amplitude components of right- and left-handed circularly polarized light. As the angle increases from 0 to $\pi/4$ the right-handed component decreases and the left-handed component increases. Switching between 0 and $\pi/2$ does not change the output polarization, but switching between any other two orientations produces two different linear combinations of right- and left-handed light. A multi-stable state smectic liquid crystal retarder, such as an antiferroelectric liquid crystal retarder, produces multiple discrete polarization states and a continuously tunable liquid crystal retarder, such as a SmA* retarder, produces a continuous range of polarization states.

Analogously, in the embodiment of FIG. 1b, orientation of liquid crystal half-wave plate 22 at angles other than 0, π/2, and ±π/4 produces linear combinations of the two circular polarizations. This embodiment is preferred for continuously tunable SmA* liquid crystal retarders because of the limited range of SmA* tilt angles currently available. To switch between right- and left-handed output light, liquid crystal half-wave plate 22 must rotate by π/4, which can be achieved with a maximum tilt angle of ±π/8. In contrast, the embodiment of FIG. 1a requires a rotation of liquid crystal quarter-wave plate 20 by π/2. To increase the rotation provided by a single liquid crystal half-wave plate, two liquid crystal half-wave plates can be used in series with optic axes rotating in opposite directions.

The handedness switch of this invention can be used in conjunction with devices which are sensitive to the handedness of the polarization of incident light. The color filters of this invention comprise a handedness switch in combination with one or more cholesteric liquid crystal circular polarizers. CCPs reflect one handedness of light within a wavelength band but transmit light outside of the reflection band as well as light of the opposite handedness. The one-color switch of this invention (FIG. 2) comprises polarizer 10 and FLC quarter-wave plate 20, which form a handedness switch, and cholesteric circular polarizer 30. In this and the following examples of color filters, the handedness switch of FIG. 1a is used for illustration, but any embodiment of the handedness switch can be employed. CCP 30 can be right- or left-handed and can have a reflection band centered at any wavelength. In this example, it is a right-handed filter with a red reflection band.

Figure 2:
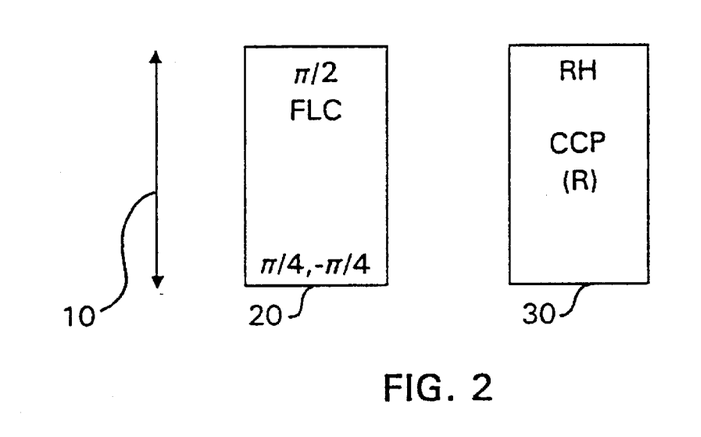
FIG. 2 is a one-color switch employing a liquid crystal handedness switch.

Light incident on polarizer 10 is converted into left-handed light when FLC 20 is oriented at π/4, which is fully transmitted by CCP 30. When the FLC is at −π/4, the light becomes right-handed. Right-handed red light is reflected by the CCP and exits at the polarizer while right-handed light at other wavelengths is transmitted. Thus for white light incident on the polarizer, the filter is a red/off switch in reflection and a cyan/on switch in transmission. For incident red light, it is a red/off switch both in reflection and in transmission.

Although the filter is illustrated in FIG. 2 with a two-state handedness switch, it can also utilize a multiple discrete state or continuously tunable handedness switch. With a continuously rotatable liquid crystal quarter-wave plate, the output can be continuously modulated between the two extreme outputs. For example, when the liquid crystal quarter-wave plate is oriented parallel to the polarizer, half the light is converted to right-handed and half to left-handed circular polarization. The red right-handed light is reflected by the CCP. The continuously tunable reflection mode filter does in fact tune between the extremes of off and red as the quarter-wave plate orientation varies between π/4 and −π/4.

For operation in reverse, with unpolarized white light incident on CCP 30 as opposed to incident on polarizer 10, the right-handed red component is reflected by the CCP and the other components are transmitted. Subsequently, the handedness switch, traversed in reverse, transmits the left-handed, white, component when oriented at π/4 and the right-handed, cyan, component when oriented at −π/4. Thus the filter is a cyan/on switch in transmission. The reflected spectrum is unchanged with switching of the FLC orientation. For unpolarized red light incident on the CCP it is a red/off switch in transmission.

Figure 3A:
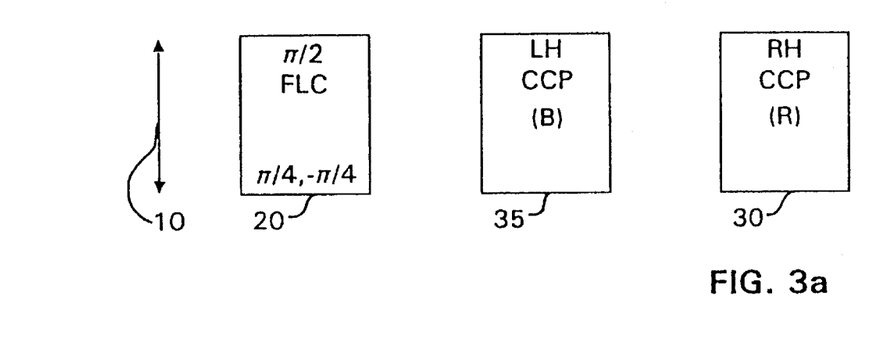
Figure 3B:
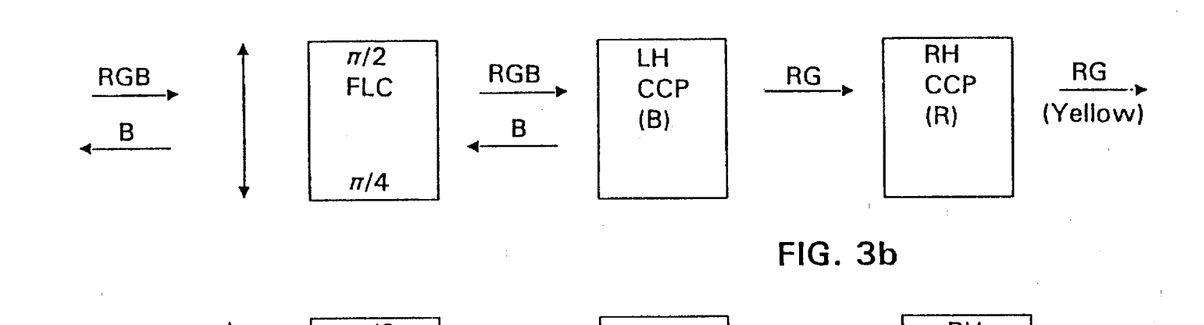
Figure 3C:
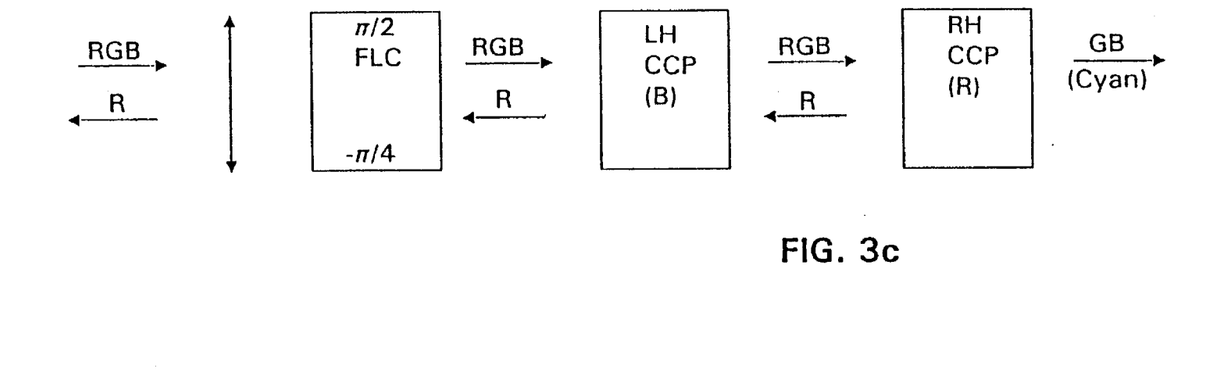

A two-color filter of this invention is illustrated in FIG. 3. In addition to the handedness switch it comprises right-handed CCP 30 and left-handed CCP 35. In this example one CCP reflects in the blue and the other in the red. Other color combinations can be used. In this and the other color filters, adjacent CCPs can be positioned in any order. For white light incident on the polarizer, this is a blue/red filter in reflection and a yellow/cyan filter in transmission. The operation is illustrated with the FLC oriented at π/4 in FIG. 3b. In this orientation, left-handed light is produced by the handedness switch. The left-handed CCP reflects the blue component and transmits the others, which are also transmitted by the right-handed CCP. When the FLC is oriented at −π/4 (FIG. 3c), right-handed light is generated. This is transmitted by the left-handed CCP. The right-handed CCP reflects the red component and transmits the other wavelengths. For unpolarized white light incident on CCP 30, as opposed to the polarizer, this filter reflects magenta light and is a cyan/yellow switch in transmission. The filter spectra are unchanged by the order of adjacent CCPs. Note that a right-handed CCP is equivalent to, and can be replaced by, a left-handed CCP in combination with a half-wave retarder.

The two-color filter can alternatively be constructed with a multiple discrete state liquid crystal or a continuously tunable liquid crystal to make a filter with three or more output spectra. When the liquid crystal quarter-wave plate is oriented parallel or perpendicular to the polarizer, the handedness switch produces equal amplitude components of right- and left-handed circularly polarized light. The red component of the right-handed light and the blue component of the left-handed light are reflected back to the handedness switch to produce a magenta output spectrum. With a continuously rotatable quarter-wave plate, the output can be continuously varied from red, through magenta, to blue.

Figure 4:
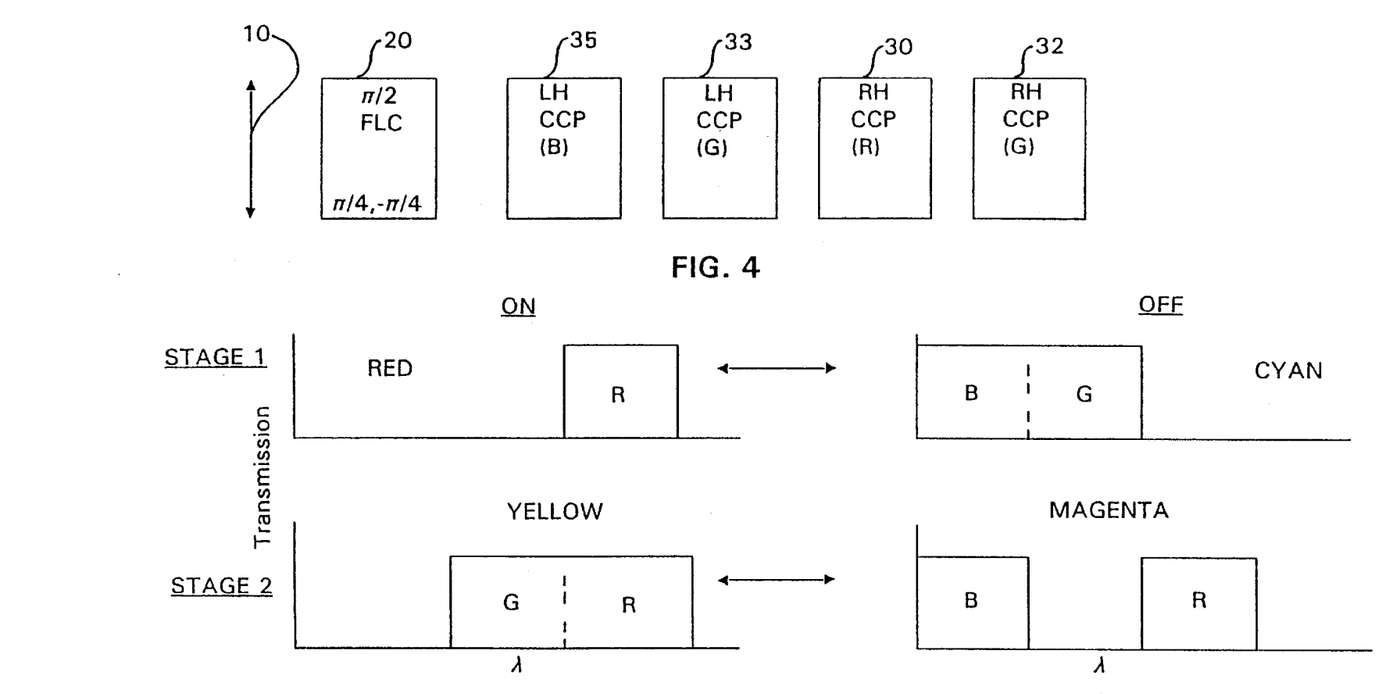
FIG. 4 is a reflection mode two-color filter employing a liquid crystal handedness switch.

The two-color filter of FIG. 3 switches between primary colors in reflection and between color mixtures in transmission. A two-color filter which provides two primary colors in transmission is illustrated in FIG. 4. Following the handedness switch, it comprises left-handed CCPs 35 and 33, and right-handed CCPs 30 and 32. One right- and one left-handed CCP have the same reflection band and the other two have different reflection bands. For white light incident on the polarizer, this is a red/blue filter in transmission and a cyan/yellow filter in reflection. For unpolarized white light incident on CCP 32, this is a red/blue filter in transmission.

Figure 5:
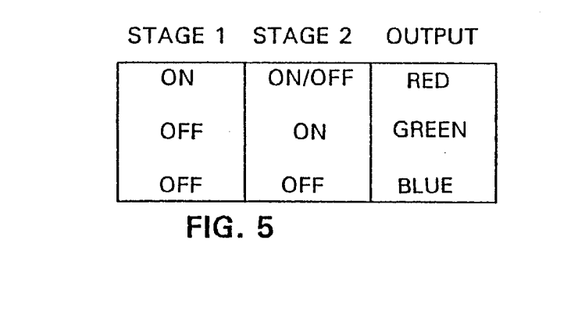
FIG. 5 is a conceptualization of the spectra produced by the two stages of a three-color transmission filter in a subtractive scheme which provides red, green, and blue output bands.

Using two FLC handedness switches, three-color filters are provided. This has particular application to color display wherein red, green and blue light can be mixed temporally or spatially to generate the entire visible spectrum. FIG. 5 illustrates a general scheme for a two-stage, three-color filter. In this example the filter is based on the primary color red. Analogous blue and green schemes can be used. In this filter scheme, the first stage switches between red and cyan while the second stage switches between yellow and magenta. The two switchable spectra of each stage are called "on" and "off". With stage one "on" and stage two either "on" or "off" the filter transmits red light. With stage one "off" the output is green for stage two "on" and blue for stage two "off". Similarly, for the filter based on green, the first stage selects between green and magenta and the second stage selects between cyan and yellow. For the filter based on blue, the first stage selects between blue and yellow and the second stage selects between cyan and magenta. In all three cases the two-stages together select between red, green and blue.

Figure 6A:
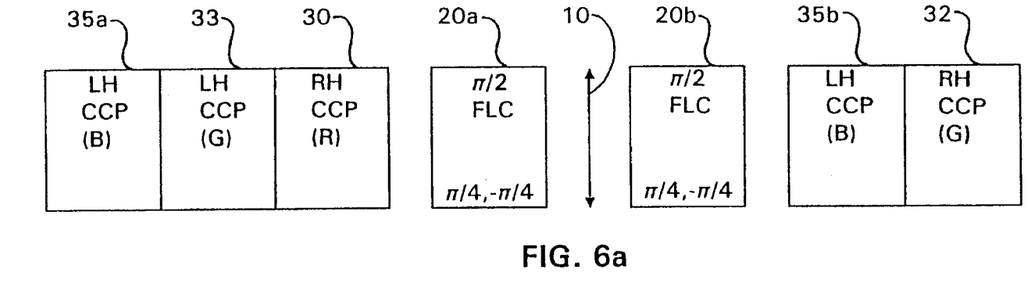

Based on this filter scheme, a two-stage three-color filter of this invention is illustrated in FIG. 6a. A stage comprises a polarizer, a liquid crystal cell, and at least one CCP. Two stages can share a single polarizer. The first stage comprises FLC quarter-wave plate 20*a* and polarizer 10, which form a reverse handedness switch, along with left-handed CCPs 35*a* and 33, and right-handed CCP 30. For unpolarized white light incident on CCP 35*a* the transmitted output of the first stage is red when FLC 20*a* is oriented at $\pi/4$ and cyan for $-\pi/4$. The second stage shares polarizer 10 and further includes FLC quarter-wave plate 20*b* to form a handedness switch, along with left-handed CCP 35*b* and right-handed CCP 32. This stage alone would be a yellow/magenta filter in transmission. In combination with the first stage, the device is a red/green/blue switch in transmission. For unpolarized white light incident on CCP 32, the device is also a red/green/blue switch in transmission. Because only one of the two orthogonally polarized components of unpolarized light is coupled through the handedness switch, the maximum transmission of this filter is 50%.

Figure 6B:
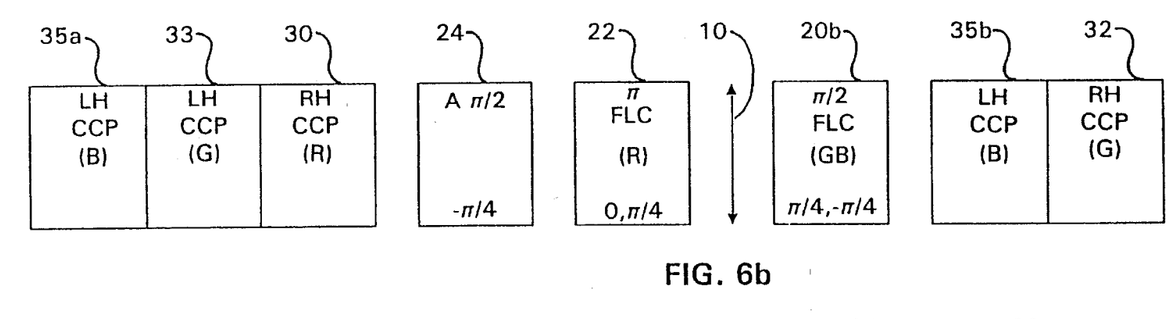

In the color filters of this invention, it is preferred that the handedness switch be achromatic over the wavelength range of operation, where the term achromatic means that the function of an element is essentially preserved for different input wavelengths. If it is not achromatic, at some wavelengths light will not be completely converted into circularly polarized light. This can result in loss in throughput and spectral purity. Achromaticity can be achieved with compound retarders. In addition, the FLC waveplates can be designed for optimum operation in the wavelengths at which they switch the filter, as illustrated in FIG. 6*b*. Since FLC quarter-wave plate 20*b* is to be used to switch between CCPs with blue and green reflection bands, it is optimized for quarter-wave retardance in cyan wavelengths. The first handedness switch, comprising FLC half-wave plate 22 and passive quarter-wave plate 24, is particularly suited to achromatic operation. Approximately achromatic passive quarter-wave plates (A $\pi/2$) are known in the art. When the liquid crystal half-wave plate is oriented at 0, parallel to the polarizer, right-handed cyan light is transmitted by the first stage. In this orientation, the FLC does not modulate the polarization of light and thus its chromaticity is irrelevant. When the FLC is oriented at $\pi/4$, only left-handed red light is transmitted by the first stage. Thus the FLC is designed to be a half-wave plate for red light. Matching the FLC plates to the wavelengths in which they are used can be done in all the filters of this invention.

Figure 7:
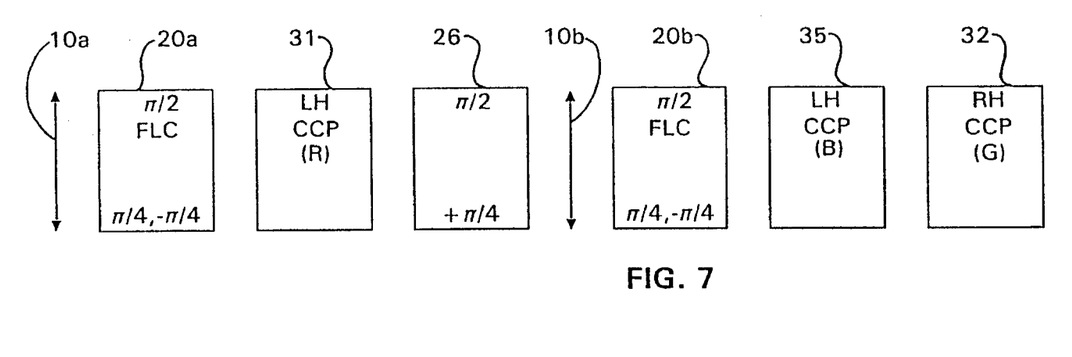
FIG. 7 is a reflection mode two-stage three-color filter employing two liquid crystal handedness switches.

A reflection mode two-stage red/green/blue filter is illustrated in FIG. 7. The first stage comprises polarizer 10*a* and FLC quarter-wave plate 20*a*, which form a handedness switch, in combination with left-handed CCP 31. When FLC 20*a* is oriented at $\pi/4$, this stage reflects red light and at $-\pi/4$ no light is reflected. The second stage comprises polarizer l0b and FLC quarter-wave plate 20*b*, which form a second handedness switch, in combination with left-handed CCP 35 and right-handed CCP 32. In this embodiment, polarizer 10*b* is parallel to polarizer 10*a*. It can alternatively be oriented at an angle to polarizer 10*a*, in which case waveplates 26 and 20*b* are adjusted accordingly. When FLC 20*b* is oriented at $\pi/4$ this stage reflects blue light and when it is at $-\pi/4$ it reflects green light. In order to obtain a pure red reflected spectrum, there must be a switching configuration in which both the green and blue light reflected by the second filter stage are blocked. Quarter-wave plate oriented at $\pi/4$, is positioned between the stages to provide this function. When FLC 20*a* is oriented at $\pi/4$ red light is reflected from the first stage, and the combination of passive quarter-wave plate 26 with FLC quarter-wave plate 20*a* converts all light reflected from the second stage into linearly polarized light orthogonal to, and therefore absorbed by, polarizer 10*a*. When FLC quarter-wave plate 20*a* is oriented at $-\pi/4$, the first stage reflects no light but it transmits the green or blue light reflected from the second stage.

For illustration, red/green/blue filters have been described. The three-color filters of this invention can also be based on any three wavelength bands. In addition, filters with four, five, six, or more colors can be fabricated within the scope of this invention.

The filters of this invention can also be constructed with infrared transmission or reflection bands. This has particular utility in series combination with a Fabry-Perot filter. A Fabry-Perot filter has a series of narrow bandwidth transmission peaks of increasing order, n. The filter of this invention can be used as an order sorting device to select one transmission peak of the Fabry-Perot filter. For a tunable Fabry-Perot filter, the three-color filter of this invention can triple the tuning range by switching between three filter orders. In optical communications this will allow triple the number of communication channels.

The color filter of this invention based on the handedness switch for circular polarization can analogously be constructed with a liquid crystal linear polarization switch in combination with colored partial polarizers. Linear colored partial polarizers, also known as linear polarizing filters, transmit light of a given wavelength band in one linear polarization and transmit all light in the orthogonal polarization. Linear colored partial polarizers and cholesteric circular polarizers are two examples of polarization sensitive wavelength filtering means, where this term is used to designate devices which provide different output spectra for incident white light of different polarizations. It specifically does not refer to neutral linear polarizers, which can provide different gray levels for incident white light of different polarizations.

Figure 8:
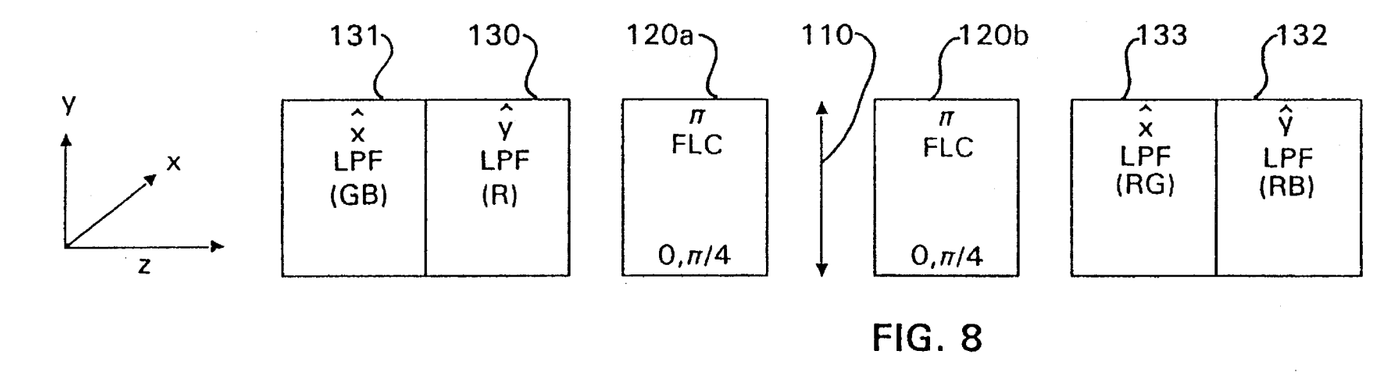
FIG. 8 is a two-stage three-color transmission mode filter employing colored partial polarizers and two liquid crystal polarization switches.

The linear polarization switch two-stage three-color filter of this invention, shown in FIG. 8, is analogous to the circular polarization switch filter of FIG. 6. Polarizer 10 and FLC half-wave plate 120*b* form a polarization switch. When the FLC is oriented at 0 (or, equivalently, at $\pi/2$), y-polarized light transmitted by the polarizer is unchanged, and when it is oriented at $\pm\pi/4$ the light is converted to x-polarization. Similarly FLC half-wave plate 120*a* and polarizer 110 form a polarization switch in reverse. When the FLC is oriented at 0 y-polarized light is transmitted through the polarizer. When it is oriented to $\pm\pi/4$, x-polarized light is converted to y-polarized light, which is transmitted through the polarizer.

For unpolarized light incident on partial polarizer 131 the filter functions as follows. Partial polarizer 131 transmits x-polarized cyan light and y-polarized white light. This is coupled into partial polarizer 10 which transmits the x-polarized cyan light and the red component of the y-polarized light. The first polarization switch selects between transmission of the red and the cyan light. The second filter stage transmits the red light for either orientation of FLC 120*b*. When the first stage transmits cyan light, the second stage switches between transmitting blue and green light for FLC 120*b* orientations of 0 and $\pi/4$, respectively. Other color switches of this invention illustrated with the circular polarization handedness switch can similarly be constructed with the linear polarization switch.

Figure 9:
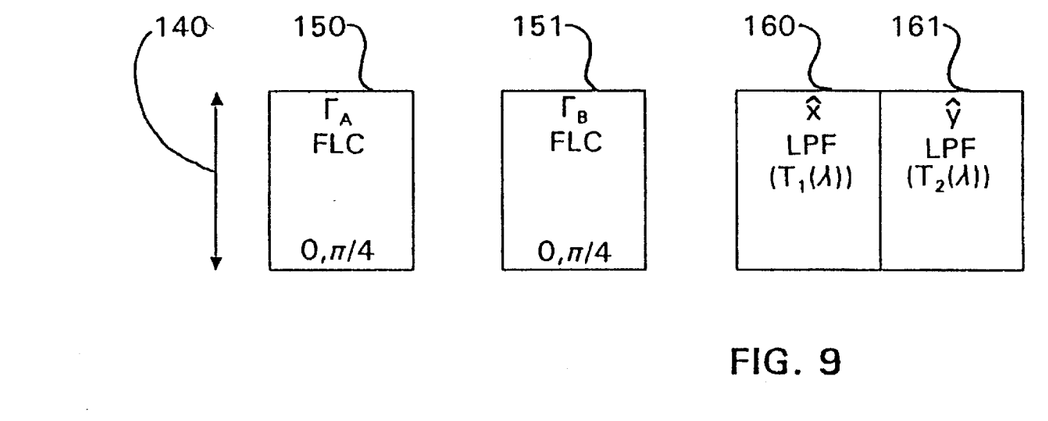
FIG. 9 is a polarization interference filter and a hybrid polarization interference/colored partial polarizer filter.

Hybrid filters can be constructed employing the color filters of this invention hybridized with other optical devices. For example, a hybrid between a polarization switch color filter and a polarization interference filter is illustrated in FIG. 9. Polarization interference filters comprise one or more retarders positioned between linear polarizers. They exploit the wavelength dependence of retarders to provide color filtering. This is in contrast to the polarization switch of this invention wherein the wavelength dependence of retarders is suppressed. The hybrid filter of FIG. 9 comprises FLC retarders 150 and 151 positioned between neutral linear polarizer 140 and linear polarizing filters 160 and 161. In this hybrid the retardance of the FLC plates is wavelength dependent and the exit polarizing means is a pair of linear polarizing filters. The filter has four output spectra which depend on the switching state, i,j of the two FLC retarders, where i is 0 or 1 for FLC 150 oriented at 0 or π/4, respectively, and j gives the orientation of FLC 151.

The output spectra T(i,j) are as follows:

$T(0,0) = T_1(\lambda)$ $T(0,1) = T_1(\lambda)\cos^2(\Gamma_A/2) + T_2(\lambda)\sin^2(\Gamma_A/2)$ $T(1,0) = T_1(\lambda)\cos^2(\Gamma_B/2) + T_2(\lambda)\sin^2(\Gamma_B/2)$ $T(1,1) = T_1(\lambda)\cos^2\left(\frac{\Gamma_A \pm \Gamma_B}{2}\right) + T_2(\lambda)\sin^2\left(\frac{\Gamma_A \pm \Gamma_B}{2}\right)$ This hybrid filter superimposes the transmission spectra of LPFs 160 and 161 on the x and y components, respectively, of the light received from the FLCs. One advantage of the hybrid over polarization interference filters is that the output in the off state, T(0,0), is a color spectrum as opposed to either white light or no light. Other hybrid filters can be constructed, as will be obvious to those skilled in the art. For example, the LPFs can be replaced with CCPs.

Figure 10:
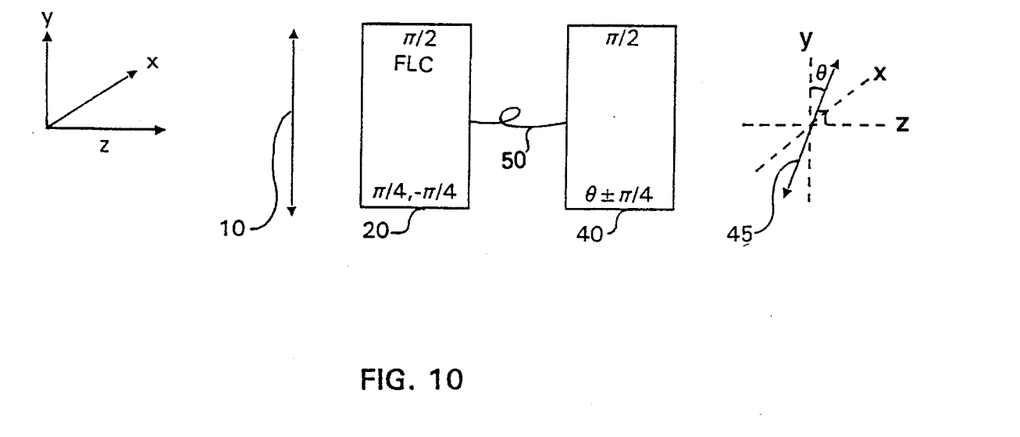
FIG. 10 is an intensity modulator employing a liquid crystal handedness switch and a circular analyzer.

The utility of the handedness switch has been demonstrated in combination with CCPs to form color filters. Another example of a handedness sensitive optical element is a circular analyzer. The combination of the handedness switch with a circular analyzer forms an intensity modulator. In one embodiment (FIG. 10) the circular analyzer comprises passive quarter-wave retarder 40 and linear polarizer 45, which are combined with the handedness switch formed by elements 10 and 20. Polarizer 45 can be oriented at any angle, Φ, with respect to polarizer 10. Quarterwave retarder 40 is oriented at ±π/4 with respect to polarizer 45. The intensity of light transmitted by polarizer 45 is a function of the handedness of light produced by the handedness switch. The intensity modulator of FIG. 10 can also function for light incident on polarizer 45. This embodiment has utility in optical communications, wherein the handedness switch can transmit binary data which is received by the circular analyzer. Optical fiber 50 can couple the handedness switch with the circular analyzer. It is particularly advantageous for communications because the intensity modulator is insensitive to the orientation, Φ, of the receiver.

This invention is a handedness switch and devices employing the handedness switch in combination with polarization sensitive optical elements. In particular, it provides color filters comprising a liquid crystal handedness switch and cholesteric circular polarizers. Analogously, this invention provides color filters comprising a liquid crystal linear polarization switch and colored partial polarizers. The invention also provides intensity modulators comprising the handedness switch in combination with a circular analyzer.

The embodiments provided herein are illustrations of the invention and do not limit the range and scope of the invention. Two liquid crystal handedness switch embodiments are illustrated. The retarders can be replaced by compound retarders, for example to provide increased achromaticity. The color filters of this invention comprising CCPs could also be constructed with nonliquid crystal handedness switches, for example with a linear polarizer and a mechanically rotatable quarter-wave plate.

In the examples provided the liquid crystal cell is a ferroelectric liquid crystal cell or a twisted nematic cell. In this invention it can be any liquid crystal cell which can be electrooptically switched between two orientations. The cell can contain, for example, SmC*, SmA*, antiferroelectric, DHF, or achiral ferroelectric liquid crystals. The polarizing means is any element which linearly polarizes light, such as linear polarizers and polarizing beamsplitters. The cholesteric circular polarizers of this invention can be cholesteric liquid crystals in the liquid state or in polymeric form. The polymeric CCPs are particularly suited to this invention because multiple layers with different handedness and reflections bands can be stacked together without significantly increasing the device thickness or fabrication complexity.

The color filters of this invention are versatile in configuration and in application. A few examples of one and two-stage filters have been included herein to teach the invention to the artisan. As will be obvious, the filters can be constructed to transmit and reflect any color bands of interest. The reflection bands of some CCPs can be tuned by varying the temperature or pressure of the device or by exposing it to various chemical compounds. By applying an electric field to a CCP the helical structure can be destroyed, thereby eliminating the associated reflection band. The number, positioning, and reflection bands of the CCPs can be varied to change the output spectra. Filters with more than two stages and with more than three output colors can be constructed with the handedness switch of this invention. Linear polarizing filters, as opposed to neutral linear polarizers, can be used as the polarizing means in the handedness switches of this invention to provide additional color filtering. One stage employing linear polarizing filters can be combined with a second stage which employs cholesteric circular polarizers. The filters can also be used in a hybrid structure with polarization interference filters such as Lyot filters. Linear polarizing filters can replace neutral linear polarizers in polarization interference filters. The filters of this invention can be used in combination with Fabry-Perot filters as an order sorting device or in combination with other optical devices. The filters can be used with polarized or unpolarized white light as color filters. They can also be used with colored light, for example, as on/off switches. The filters can be temporally multiplexed between two or more output spectra to create additional colors for slow response detectors such as the human eye. They can be used in multiple pixel arrays, for example for display applications. The filters can also be optically addressed. Additional variations, combinations, and applications of this invention will be readily apparent to those skilled in the art.

We claim:

1. A liquid crystal wavelength filter for light comprising:

a first linear polarizer having an axis of polarization;

a first liquid crystal retarder means, having a quarter-wave retardance and having an optic axis switchable between orientations of π/4 and −π/4 with respect to said axis of polarization, for receiving light from said first linear polarizer and for converting it into light with polarization switchable between a first and a second circular linear polarization, said first liquid crystal retarder means comprising a liquid crystal cell; and a first polarization sensitive wavelength filtering means for receiving light from said first liquid crystal retarder means and for transmitting a first spectrum for light of said first circular polarization and a second spectrum for light of said second circular polarization; said first polarization sensitive wavelength filtering means comprising a first cholesteric circular polarizer of a first handedness, a second cholesteric circular polarizer of a second handedness and a third cholesteric circular polarizer.

2. The wavelength filter of claim 1 further comprising a fourth cholesteric circular polarizer.

3. The wavelength filter of claim 2 wherein said first, second, third and fourth cholesteric circular polarizers have transmission spectra such that said first spectrum is a first primary color and said second spectrum is a second primary color.

4. A modulator comprising:

a first linear polarizer having an axis of polarization;

a first handedness sensitive device comprising a first cholesteric circular polarizer of a first handedness, a second cholesteric circular polarizer of a second handedness and a third cholesteric circular polarizer; and a first quarter-wave retarder unit, positioned between said first linear polarizer and said first handedness sensitive device, said retarder unit selected from the group consisting of:
 (A) a smectic liquid crystal quarter-wave retarder having an optic axis switchable between orientations of $\pi/4$ and $-\pi/4$ with respect to said axis of polarization;
 (B) a passive quarter-wave retarder with optic axis oriented at $\pm\pi/4$ with respect to said axis of polarization; in combination with a smectic liquid crystal half-wave retarder, positioned between said first linear polarizer and said passive quarter-wave retarder, having an optic axis switchable between a first orientation of 0 or $\pi/2$ and a second orientation of $\pm\pi/4$ with respect to said axis of polarization; and
 (C) a passive quarter-wave retarder with optic axis oriented at $\pm\pi/4$ with respect to said axis of polarization; in combination with a twisted nematic liquid crystal cell positioned between said first linear polarizer and said passive quarter-wave retarder.

5. The modulator of claim 4 wherein said first handedness sensitive device further comprises a fourth cholesteric circular polarizer, of said second handedness.

6. The modulator of claim 5 wherein said first and said second cholesteric circular polarizers have reflection bands of a first primary color, and wherein said third cholesteric circular polarizer has a reflection band of a second primary color, and wherein said fourth cholesteric circular polarizer has a reflection band of a third primary color.

7. A modulator comprising:

a first handedness sensitive device;

a second handedness sensitive devices;

a first linear polarizer having an axis of polarization, said first linear polarizer positioned between said first and said second handedness sensitive devices;

a first quarter-wave retarder unit, positioned between said first linear polarizer and said first handedness sensitive device, said first retarder unit selected from the group consisting of:
 (A) a smectic liquid crystal quarter-wave retarder having an optic axis switchable between orientations of $\pi/4$ and $-\pi/4$ with respect to said axis of polarization;
 (B) a passive quarter-wave retarder with optic axis oriented at $\pm\pi/4$ with respect to said axis of polarization; in combination with a smectic liquid crystal half-wave retarder, positioned between said first linear polarizer and said passive quarter-wave retarder, having an optic axis switchable between a first orientation of 0 or $\pi/2$ and a second orientation of $\pm\pi/4$ with respect to said axis of polarization; and
 (C) a passive quarter-wave retarder with optic axis oriented at $\pm\pi/4$ with respect to said axis of polarization; in combination with a twisted nematic liquid crystal cell positioned between said first linear polarizer and said passive quarter-wave retarder; and a second quarter-wave retarder unit, positioned between said first linear polarizer axed said second handedness sensitive device, said second retarder unit selected from the group consisting of:
 (A) a smectic liquid crystal quarter-wave retarder having an optic axis switchable between orientations of $\pi/4$ and $-\pi/4$ with respect to said axis of polarization;
 (B) a passive quarter-wave retarder with optic axis oriented at $\pm\pi/4$ with respect to said axis of polarization; in combination with a smectic liquid crystal half-wave retarder, positioned between said first linear polarizer and said passive quarter-wave retarder, having an optic axis switchable between a first orientation of 0 or $\pi/2$ and a second orientation of $\pm\pi/4$ with respect to said axis of polarization; and
 (C) a passive quarter-wave retarder with optic axis oriented at $\pi/4$ with respect to said axis of polarization; in combination with a twisted nematic liquid crystal cell positioned between said first linear polarizer and said passive quarter-wave retarder.

8. The modulator of claim 7 wherein said first and second handedness sensitive devices each comprise a cholesteric circular polarizer.

9. The modulator of claim 8 wherein said first handedness sensitive device comprises a first cholesteric circular polarizer of a first handedness having a reflection band of a first primary color, and a second cholesteric circular polarizer of a second handedness having a reflection band of a second primary color.

10. The modulator of claim 9 wherein said second handedness sensitive device comprises a third cholesteric circular polarizer, of said first handedness, having a reflection band of a third primary color, and a fourth cholesteric circular polarizer, of said second handedness, having a reflection band of said first primary color, and a fifth cholesteric circular polarizer, of said second handedness, having a reflection band of said second primary color.

11. The modulator of claim 10 wherein said second quarter-wave retarder unit is selected from the group consisting of:

a passive quarter-wave retarder with optic axis oriented at $\pm\pi/4$ with respect to said axis of polarization; in combination with a smectic liquid crystal half-wave retarder, positioned between said first linear polarizer and said passive quarter-wave retarder, having an optic axis switchable between a first orientation of 0 or $\pi/2$ and a second orientation of $\pm\pi/4$ with respect to said axis of polarization; and a passive quarter-wave retarder with optic axis oriented at $\pm\pi/4$ with respect to said axis of polarization; in combination with a twisted nematic liquid crystal cell positioned between said first polarizer and said passive quarter-wave retarder; and wherein said passive quarter-wave retarder is a compound achromatic retarder.

12. A liquid crystal wavelength filter for light comprising:

a first polarization sensitive wavelength filtering means for transmitting a first spectrum for light of a first circular polarization and a second spectrum for light of a second circular polarization;

a second polarization sensitive wavelength filtering means;

a first linear polarizer having an axis of polarization, said first linear polarizer positioned between said first and second polarization sensitive wavelength filtering means;

a first liquid crystal retarder means, positioned between said first linear polarizer and said first polarization sensitive wavelength filtering means, having a quarter-wave retardance and having an optic axis switchable between orientations of $\pi/4$ and $-\pi/4$ with respect to said axis of polarization, for receiving light from said first linear polarizer and for converting it into light with polarization switchable between said first and said second circular polarizations, said first liquid crystal retarder means comprising a liquid crystal cell; and a second liquid crystal retarder means, positioned between said first linear polarizer and said second polarization sensitive wavelength filtering means, having an optic axis switchable between a first orientation and a second orientation.

13. The wavelength filter of claim 12 wherein said second liquid crystal retarder means is a liquid crystal quarter-wave retarder means having an optic axis switchable between orientations of $\pi/4$ and $-\pi/4$ with respect to said axis of polarization.

14. The wavelength filter of claim 13 wherein said liquid crystal quarter-wave retarder means comprises a smectic liquid crystal quarter-wave retarder having an optic axis switchable between orientations of $\pi/4$ and $-\pi/4$ with respect to said axis of polarization.

15. The wavelength filter of claim 13 wherein said liquid crystal quarter-wave retarder means comprises:

a passive quarter-wave retarder with optic axis oriented at $\pm\pi/4$ with respect to said axis of polarization; and a smectic liquid crystal half-wave retarder, positioned between said first linear polarizer and said passive quarter-wave retarder, with optic axis switchable between a first orientation of 0 or $\pi/2$ and a second orientation of $\pm\pi/4$ with respect to said axis of polarization.

16. The wavelength filter of claim 13 wherein said second polarization sensitive wavelength filtering means comprises a cholesteric circular polarizer.

17. The wavelength filter of claim 12 wherein said second liquid crystal retarder means is a liquid crystal half-wave retarder means having an optic axis switchable between a first orientation of 0 or $\pi/2$ and a second orientation of $\pm\pi/4$ with respect to said axis of polarization.

18. The wavelength filter of claim 17 wherein said second polarization sensitive wavelength filtering means comprises a linear colored partial polarizer.

19. The wavelength filter of claim 13 wherein said liquid crystal quarter-wave retarder means comprises:

a passive quarter-wave retarder with optic axis oriented at $\pm\pi/4$ with respect to said axis of polarization; and a twisted nematic liquid crystal cell positioned between said first polarizer and said passive quarterwave retarder.

20. The wavelength filter of claim 12 wherein said first and second polarization sensitive wavelength filtering means have transmission or reflection spectra such that switching said first and second liquid crystal retarders provides output light switchable between three primary colors.

* * * * *

UNITED STATES PATENT AND TRADEMARK OFFICE
CERTIFICATE OF CORRECTION

PATENT NO. : 5,619,355

DATED : Apr. 8, 1997

INVENTOR(S) : Sharp et al.

It is certified that error appears in the above-identified patent and that said Letters Patent is hereby corrected as shown below:

At column 12, claim 1, line 62, please delete "linear".

At column 13, claim 7, line 52, "devices;" should read --device;--.

At column 14, claim 7, line 11, "axed" should read --and--.

At column 14, claim 7, line 26, "$\pi/4$" should read --$\pm\pi/4$--.

At column 14, claim 11, line 64, "first polarizer" should read --first linear polarizer--.

Signed and Sealed this

Nineteenth Day of August, 1997

*Attest:*

*Attesting Officer*

BRUCE LEHMAN

*Commissioner of Patents and Trademarks*